United States Patent
Yamamoto

(10) Patent No.: US 7,365,900 B2
(45) Date of Patent: Apr. 29, 2008

(54) ELECTROPHORETIC SHEET, ELECTROPHORETIC DEVICE, METHOD FOR MANUFACTURING ELECTROPHORETIC DEVICE, AND ELECTRONIC APPARATUS

(75) Inventor: Hitoshi Yamamoto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/652,211

(22) Filed: Jan. 11, 2007

(65) Prior Publication Data

US 2007/0159681 A1 Jul. 12, 2007

(30) Foreign Application Priority Data

Jan. 12, 2006 (JP) ............................. 2006-005376
Dec. 11, 2006 (JP) ............................. 2006-333793

(51) Int. Cl.
*G02B 26/00* (2006.01)
*G09G 3/34* (2006.01)

(52) U.S. Cl. ................... 359/296; 345/107; 428/411.1; 430/32

(58) Field of Classification Search ................ 359/296, 359/452; 345/84, 85, 105, 107, 108; 524/104, 524/437, 474, 795, 860; 427/387; 428/411.1; 430/32, 34, 38; 204/450
See application file for complete search history.

(56) References Cited

U.S. PATENT DOCUMENTS

| | | | | |
|---|---|---|---|---|
| 6,825,829 B1 * | 11/2004 | Albert et al. | ................ | 345/107 |
| 6,829,078 B2 * | 12/2004 | Liang et al. | ................ | 359/296 |
| 6,831,769 B2 * | 12/2004 | Holman et al. | ............. | 359/296 |
| 6,958,842 B2 * | 10/2005 | Miura et al. | ................ | 359/252 |
| 6,982,178 B2 * | 1/2006 | LeCain et al. | ................ | 438/22 |
| 7,136,216 B1 * | 11/2006 | Daniel et al. | ................ | 359/296 |
| 7,158,282 B2 * | 1/2007 | Liang et al. | ................ | 359/296 |
| 7,236,292 B2 * | 6/2007 | LeCain et al. | ............. | 359/296 |

FOREIGN PATENT DOCUMENTS

JP 2002-202534 A 7/2002

* cited by examiner

*Primary Examiner*—Loha Ben
(74) *Attorney, Agent, or Firm*—AdvantEdge Law Group, LLC

(57) ABSTRACT

An electrophoretic sheet, comprises: a substrate having a first side; a microcapsule contained layer having a second side and a third side facing the second side, the second side being disposed on the first side of the substrate, the layer including: a microcapsule; and a binder having viscid property at normal temperature and holding the microcapsule, the microcapsule including: a shell; an electrophoretic dispersion liquid included in the shell; and at least one electrophoretic particle included in the electrophoretic dispersion liquid.

18 Claims, 6 Drawing Sheets

ELECTROPHORETIC SHEET, ELECTROPHORETIC DEVICE, METHOD FOR MANUFACTURING ELECTROPHORETIC DEVICE, AND ELECTRONIC APPARATUS

BACKGROUND

1. Technical Field

The present invention relates to an electrophoretic sheet, an electrophoretic device, a method for manufacturing an electrophoretic device, and an electronic apparatus.

2. Related Art

Generally, it is known that fine particles move (migrate) in a liquid by a coulomb power if an electric field is applied to a dispersal system in which fine particles are dispersed into a liquid. This phenomenon is called an electrophoresis. Recently, an electrophoretic device using this electrophoresis attracts attention as a new display that can display desired information (an image).

The electrophoretic device includes features such as a display memory and a wide viewing angle in a state without an applied voltage, and an ability of high-contrast display at low power consumption.

Since the electrophoretic device is a nonemissive device, it is less harmful to eyes than an emissive display device such as a cathode-ray tube display.

As such an electrophoretic device, a microcapsule-type device is known in which a plurality of microcapsules encapsulating electrophoretic particles and a liquid phase dispersion medium, and a binder fixing each substrate and microcapsules are disposed between a pair of substrates that have electrodes.

JP-A-2002-202534 discloses a method for manufacturing such electrophoretic device, in which a microcapsule dispersion liquid containing a plurality of microcapsules, a binder, and a dispersion medium is supplied onto one substrate, followed by removing the dispersion liquid so that microcapsules are disposed, and then the other substrate is bonded to the one substrate.

In JP-A-2002-202534, an emulsion adhesive is used as the binder. However, the adhesive makes it difficult to re-arrange the microcapsules once the microcapsules are disposed and arranged on the one substrate since the adhesive becomes hardened at normal temperature. As a result, a problem arises in that a region where microcapsules overlap and a region including no microcapsules exist in the resulting electrophoretic device. The problem may cause a display unevenness in electrophoretic devices.

SUMMARY

An advantage of the invention is to provide an electrophoretic sheet capable to form an electrophoretic device having a favorable display performance, a method for manufacturing an electrophoretic device, which method can easily and reliably manufacture the electrophoretic device, and an electronic apparatus.

The advantage is achieved by the following aspects of the invention.

An electrophoretic sheet according to a first aspect of the invention includes a substrate having a first side and a microcapsule contained layer having a second side and a third side facing the second side. The second side is disposed on the first side of the substrate. The layer includes a microcapsule, and a binder having viscid property at normal temperature and holding the microcapsule. The microcapsule includes a shell, an electrophoretic dispersion liquid included in the shell, and at least one electrophoretic particle included in the electrophoretic dispersion liquid.

In the electrophoretic sheet, the term "normal temperature" means, for example, a temperature at which the electrophoretic sheet is used. Typically, a temperature from 15 degrees centigrade to 30 degrees centigrade, preferably a temperature at 25 degrees centigrade and near it.

An electrophoretic sheet according to a second aspect of the invention includes a substrate having a first side and a microcapsule contained layer having a second side and a third side. The second side is disposed on a first side of the substrate. The layer includes a microcapsule, and a binder having viscid property at normal temperature and holding the microcapsule. The microcapsule includes a shell, an electrophoretic dispersion liquid included in the shell, and at least one electrophoretic particle included in the electrophoretic dispersion liquid. The binder has a 180-degree peeling adhesive strength of from 5N/25 mm to 150N/25 mm as measured in accordance with JIS K 6854.

The electrophoretic sheet capable to form an electrophoretic device having a favorable display performance is thus obtained.

In the electrophoretic sheet, a melting point of the binder is preferably 25 degrees centigrade or less.

Such binder shows sufficient fluidity at normal temperature, whereby the binder is easily handled at normal temperature.

The binder preferably has a 180-degree peeling adhesive strength of from 5N/25 mm to 150N/25 mm as measured in accordance with JIS K 6854.

The binder having the 180-degree peeling adhesive strength of the above range demonstrates appropriate viscosity at normal temperature. As a result, the electrophoretic sheet and the counter substrate can be reliably bonded (fixed) by using the binder.

The binder preferably mainly contains (metha)acrylic acid ester.

The binder mainly containing (metha)acrylic acid ester is preferable since it is easily available and has appropriate viscid property at normal temperature.

The number of carbons of the (metha)acrylic acid ester is preferably from 5 to 20.

The binder mainly containing (metha)acrylic acid ester described above is preferable since it has more appropriate viscid property at normal temperature.

The shell preferably mainly contains a material including gelatin.

The material allows flexibility of the microcapsule to be improved. In addition, gelatin has high affinity for (metha)acrylic acid ester preferably used for the binder, thereby being preferable for further increasing a force of the binder to fix (force to hold) the microcapsule.

The electrophoretic dispersion liquid preferably includes the electrophoretic particle dispersed in a dispersion medium containing liquid paraffin.

The dispersion medium (liquid phase dispersion medium) mainly containing liquid paraffin is preferable since it has high coagulation inhibitory effect on the electrophoretic particle, and low affinity (low solubility) for the constituent material of the shell.

The liquid paraffin is preferably isoparaffin.

Isoparaffin is particularly preferable in liquid paraffin since it has high coagulation inhibitory effect on the electrophoretic particle.

The number of carbons of the isoparaffin is preferably from 5 to 15.

By using isoparaffin having the number of carbons of the above range for the dispersion medium, an effect can be obtained in which the dispersion medium gives sufficiently small sedimentation speed to the electrophoretic particle due to a little specific gravity difference with respect to the electrophoretic particle while the viscosity of the dispersion medium is prevented from being unnecessarily increased. As a result, the display performance (particularly, response speed and holding characteristics) of the electrophoretic device can be improved.

An electrophoretic device according to a third aspect of the invention includes the electrophoretic sheet of the first aspect, and a counter substrate disposed adjacent to the third side of the microcapsule contained layer.

The electrophoretic device having high reliability is thus obtained.

The electrophoretic device preferably includes an adhesive layer bonding the electrophoretic sheet and the counter substrate.

The adhesive layer can reliably fix the electrophoretic sheet and the counter substrate.

The adhesive layer preferably has insulation property.

The adhesive layer reliably prevents electrodes from a short, whereby electric field can reliably act on the electrophoretic particle.

The adhesive layer preferably prevents an ion from diffusing to the counter substrate from the electrophoretic sheet.

The adhesive layer can prevent or suppress the characteristics of a circuit (particularly, a switching element) from being deteriorated.

The adhesive layer preferably absorbs and holds moisture that penetrates into the electrophoretic device.

The adhesive layer prevents or suppresses moisture from diffusing into the microcapsule, a circuit and the like, even though moisture penetrates into the electrophoretic device, enabling them to be prevented from being deteriorated.

The adhesive layer preferably reduces a stress produced in bonding the electrophoretic sheet and the counter substrate.

The adhesive layer can prevent the microcapsule, a switching element, and the like from being broken in manufacturing (making) the electrophoretic device.

The adhesive layer preferably mainly contains polyurethane.

Polyurethane is preferable since it can reliably give the above functions to the adhesive layer.

In the electrophoretic device, a ratio of the average thickness of the adhesive layer to the average thickness of the microcapsule contained layer is preferably from 0.1 to 3.

This relation particularly allows the adhesive layer to improve insulation property and reducing a stress produced in bonding the electrophoretic sheet and the counter substrate.

A method for manufacturing an electrophoretic device according to a fourth aspect of the invention includes a first step to prepare the electrophoretic sheet of the first aspect, and a second step to bond a counter substrate adjacent to the third side of the microcapsule contained layer.

The second step is carried out at normal temperature.

The electrophoretic device having high reliability thus can be easily and reliably manufactured.

The second step preferably further includes reducing a thickness of the microcapsule contained layer so as to deform the microcapsule.

The electrophoretic device having higher reliability thus can be easily and reliably manufactured.

An electronic apparatus according to a fifth aspect of the invention includes the electrophoretic device of the third aspect.

The electronic apparatus with high reliability is thus obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As preferred embodiments of the invention, an electrophoretic sheet, an electrophoretic device, a method for manufacturing an electrophoretic device, and an electronic apparatus will now be described in detail with reference to the accompanying drawings.

Electrophoretic Device

First, an electrophoretic device according to an embodiment of the invention is described. The electrophoretic device includes an electrophoretic sheet according to another embodiment of the invention.

Figure 1:
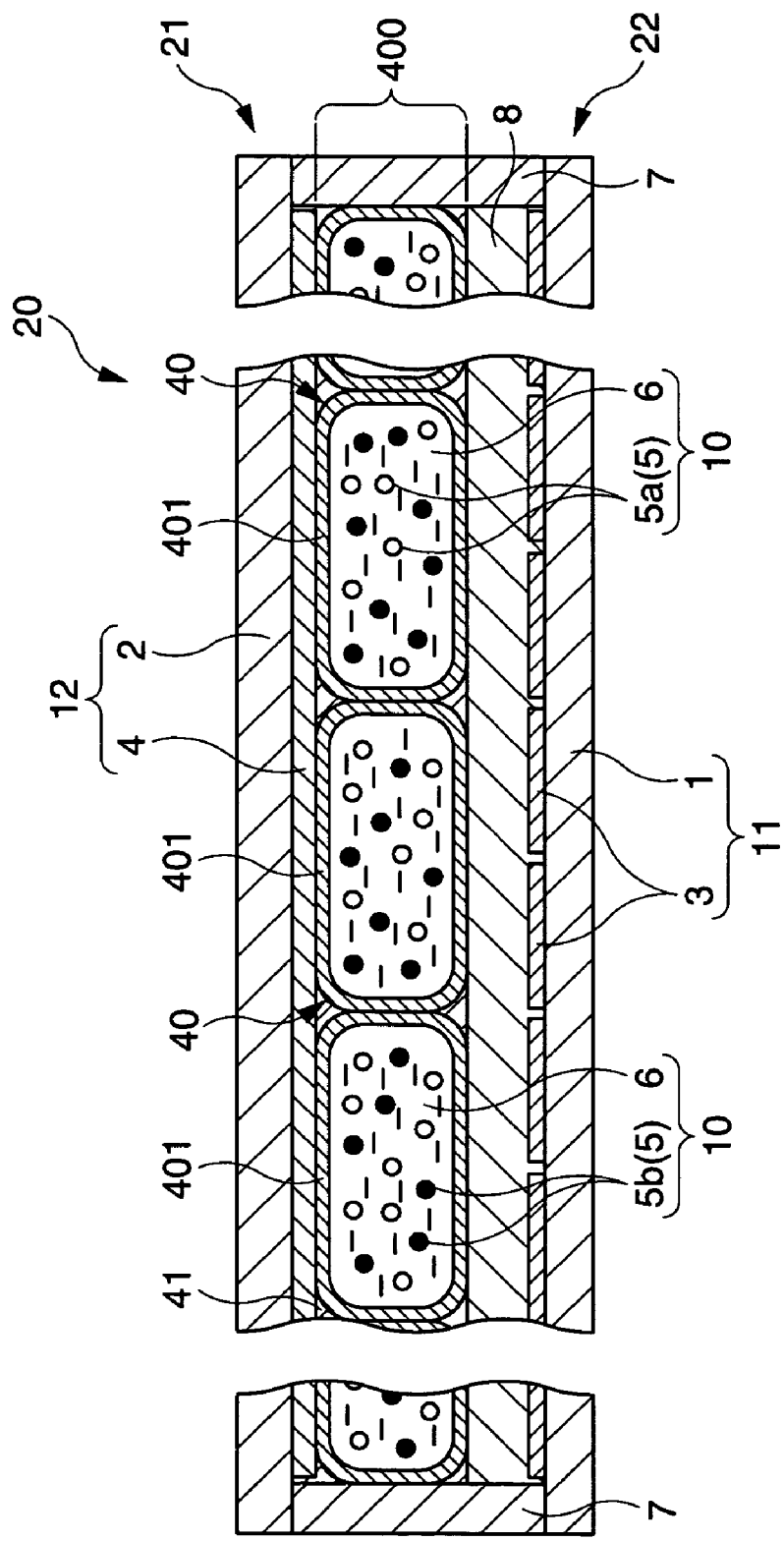
FIG. 1 is a longitudinal cross-sectional view schematically illustrating an electrophoretic device according to an embodiment of the invention.

FIG. 1 is a longitudinal cross-sectional view schematically illustrating the electrophoretic device of the embodiment. In the following description, the top side in FIG. 1 is described as "up", while the bottom side is described as "down" for simplifying the description.

An electrophoretic device 20 shown in FIG. 1 includes an electrophoretic sheet (front plane) 21, a circuit substrate (back plane) 22, an adhesive layer 8 bonding the electrophoretic sheet 21 and the circuit substrate 22, and a sealing part 7 air-tightly sealing a gap between the electrophoretic sheet 21 and the circuit substrate 22.

The electrophoretic sheet 21 includes a substrate 12 and a microcapsule contained layer 400. The substrate 12 is composed of a base 2 having a plate shape and a second electrode 4 disposed on the under surface of the base 2, while the microcapsule contained layer 400 is composed of microcapsules 40 and a binder 41.

In contrast, the circuit substrate 22 includes a counter substrate 11 and a circuit (not shown) provided to a counter substrate 11 (a base 1). The counter substrate 11 is composed of the base 1 having a plate shape and a plurality of first electrodes 3 disposed on the upper surface of the base 1. The circuit includes a switching element such as TFT.

A structure of each element will now be described sequentially.

Each of the base 1 and the base 2 is formed of a sheet (tabular) member, and supports and protects each component disposed between them.

Each of the base 1 and the base 2 can be flexible or hard. However, it is preferable to be flexible. Using the bases 1 and 2 having flexibility can provide the electrophoretic device 20 having flexibility, i.e., the electrophoretic device 20 useful for achieving an electronic paper, for example.

When each of the substrates 1 and 2 needs flexibility, one or more than one in mixture of the following materials can be used: polyolefin such as polyethylene, polypropylene, and ethylene-vinyl acetate copolymer; crystalline liquid polymer such as modified polyolefin, polyamide (e.g., nylon-6, nylon-46, nylon-66, nylon-610, nylon-612, nylon-11, nylon-12, nylon-6-12, and nylon-6-66), thermoplastic polyimide, and aromatic polyester; various thermoplastic elastomer such as polyphenylene oxide, polyphenylene sulfide, polycarbonate, polymethyl methacrylate, polyether, polyether ether ketone, polyetherimide, polyacetal, styrene series, polyolefine series, polyvinylchloride series, polyurethane series, polyester series, polyamide series, polybutadiene series, transpolyisoprene series, fluororubber series, and chlorinated polyethylene series; copolymers, blended materials, and polymer alloys that mainly contain the above materials; and the like.

The average thickness of the base 1 or the base 2 is not limited, but is accordingly determined depending on its constituent materials, its application, or the like. If the base 1 or the base 2 needs flexibility, it is preferable that the thickness be from about 20 µm to about 500 µm, more preferably from about 25 µm to about 250 µm. As a result, the electrophoretic device 20 can be downsized (especially thinned) while harmonizing with its flexibility and strength.

On the upper surface of the base 1, which is adjacent to the microcapsules 40, the first electrodes 3 are provided as a layer (film), while on the lower surface of the base 2, which is adjacent to the microcapsules 40, the second electrode 4 is disposed as a layer (film).

Applying a voltage between the first electrodes 3 and the second electrode 4 produces an electric field, whereby the electric field acts on electrophoretic particles (display particles) 5.

In the embodiment, the second electrode 4 is a common electrode, while each of the first electrodes 3 is an individual electrode, which is an element of a matrix and a pixel electrode connected to a switching element. A part in which one first electrode 3 overlaps with the second electrode 4 forms one pixel.

The second electrode 4 may be divided into a plurality of electrodes in the same way with the first electrodes 3.

In addition, a structure may be employed in which both the first electrode and the second electrode are divided into a stripe shape, and intersect each other.

Constituent materials of each of the electrode 3 and the electrode 4 are not limited as long as they are conductive. One or more than one in mixtures of the following conductive materials can be used: a metal such as copper, aluminum, nickel, cobalt, platinum, gold, silver, molybdenum, tantalum, and alloys of thereof, a carbonaceous material such as carbon black, carbon nanotube, and fullerene; an electron conductive high-polymer material such as polyacetylene, polypyrrole, polythiophene, polyaniline, poly(p-phenylene), poly(p-phenylene vinylene), polyfluorene, polycarbazole, polysilane, and derivatives thereof, an ion conductive high-polymer material in which an ionic material such as $NaCl$, $LiClO_4$, $KCl$, $H_2O$, $LiCl$, $LiBr$, $LiI$, $LiNO_3$, $LiSCN$, $LiCF_3SO_3$, $NaBr$, $NaI$, $NaSCN$, $NaClO_4$, $NaCF_3SO_3$, $KI$, $KSCN$, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $)_2$, and $Cu(CF_3SO_3)_2$ is dispersed in a matrix resin such as polyvinyl alcohol, poly carbonate, polyethylene oxide, polyvinyl butyral, polyvinyl carbazole, and vinyl acetate; or a conductive oxide material such as indium tin oxide (IO), fluoride doped tin oxide (FTO), tin oxide ($SnO_2$), and indium oxide (IO).

Other than the above materials, various composite materials can be used for the electrode 3 and the electrode 4. For example, a composite material can be used that has a conductive property given by mixing a conductive material (conductive particle) such as gold, silver, nickel, and carbon into a non-conductive material such as a glass material, a rubber material, and a polymer material.

Specific examples of the composite materials include: a conductive rubber in which a conductive material is mixed into a rubber material; a conductive adhesive or a conductive paste in which a conductive material is mixed into an adhesive composition such as epoxy, urethane, and acrylic resins; and a conductive plastic in which a conductive material is mixed into a matrix resin such as polyolefin, polyvinyl chloride, polystyrene, ABS resin, nylon (polyamide), ethylene vinyl acetate polymer, polyester, acrylic resin, epoxy resin, and urethane resin.

Each average thickness of the electrode 3 and the electrode 4 is not limited, but is accordingly determined depending on constituent materials, an application, or the like. It is preferable that the thickness be from about 0.05 µm to about 10 µm, more preferably from about 0.05 µm to about 5 µm.

Among the bases 1 and 2 and the electrodes 3 and 4, a base and an electrode located on the side of the display surface (the second base 2 and the second electrode 4 in the embodiment) are to have optical transparency, in particular, are to be substantially transparent (colorless and transparent, colored and transparent, or translucent). This transparency allows the state of the electrophoretic particles 5 in an electrophoretic dispersion liquid 10 described later, i.e., information (an image) displayed on the electrophoretic device 20 to be easily visually recognized.

Here, each of the electrode 3 and the electrode 4 may have a multilayered structure in which a plurality of materials are layered one upon another, for example, other than a single-layer structure as described above. That is, each of the electrode 3 and the electrode 4 may have a single-layer structure made of ITO, or may have a two-layer structure composed of an ITO layer and a polyaniline layer, for example.

In the electrophoretic sheet 21, the microcapsule contained layer 400 is provided contacting on the lower surface of the second electrode 4.

In the microcapsule contained layer 400, a plurality of microcapsules 40, in which an electrophoretic dispersion liquid 10 is sealed into a capsule body (shell) 401, is fixed (held) with the binder 41.

The microcapsules 40 are disposed between the counter substrate 11 and the substrate 12 in single layer so as to be arranged both lengthwise and crosswise without overlapping in the thickness direction.

In the embodiment, the microcapsules 40 are compressed in the up-and-down direction by sandwiching the second electrode 4 and the adhesive layer 8, thereby stretching out in the horizontal direction to be flattened. In other words, the microcapsules 40 form a stonewall structure in a plan view.

This structure increases an effective display area and makes a good contrast in the electrophoretic device 20. In addition, the electrophoretic particles 5 can be moved and gathered in the vicinity of a predetermined electrode in a short period of time since moving distances of the electrophoretic particles 5 in the up-and-down direction can be shortened. As a result, a response speed can be increased.

Further, one microcapsule 40 is disposed on two first electrodes 3 adjacent each other in the embodiment. That is, one microcapsule 40 is disposed so as to straddle two first electrodes 3 adjacent each other.

As a constituent material for the capsule body (shell) 401, one or more than one in mixture of the following materials can be used: gelatin; a complex material composed of gum acacia and gelatin; and various resin materials such as urethane resin, melamine resin, urea resin, polyamide, and polyether.

Among them, a material containing gelatin, especially a material mainly contains gelatin, is preferably included in the capsule body 401. This material allows the microcapsule 40 to improve its flexibility, whereby the stonewall structure described above can be reliably formed. In addition, gelatin has high affinity for (metha)acrylic acid ester preferably used for the binder 41 as described later, thereby being preferable for further increasing a force of the binder 41 to fix (force to hold) the microcapsules 40.

Examples of gelatin include: lime-treated gelatin; acid-treated gelatin; decalcified gelatin in which the content of calcium and the like is reduced; and a gelatin in which methionine residue is reduced by oxidizing, other than a gelatin without treatment. One or more than one in mixture of them can be used.

A material may be used for the capsule body 401 in which a cross-linking agent forms a cross-linking (a steric cross-linking). This material can improve the strength of the capsule body 401 while maintaining its flexibility. As a result, the microcapsules 40 can be prevented from being easily collapsed.

Each microcapsule 40 preferably has an approximately same size. As a result, the electrophoretic device 20 can demonstrate more favorable display performance since the occurrence of a display unevenness is prevented or reduced.

The electrophoretic dispersion liquid 10 contains at least one type of electrophoretic particle 5 (in the embodiment, two types: a colored particle 5b and a white particle 5a) that is dispersed (suspended) in a liquid phase dispersion medium 6.

Dispersing the electrophoretic particles 5 into the liquid phase dispersion medium 6 is enabled, for example, by one or combining more than one of the following methods: a paint shaker method, a ball mill method, a media mill method, an ultrasonic dispersion method, a stirrer dispersion method, and the like.

The liquid phase dispersion medium 6 is preferably used that has low solubility with respect to the capsule body 401 and relatively high insulation properties.

As the liquid phase dispersion medium 6, for example, one or more than one in mixture of the following substances can be used: various water such as distilled water, purified water, ion-exchanged water, and RO water; alcohols such as methanol, ethanol, isopropanol, butanol, octanol, ethylene glycol, diethylene glycol, and glycerin; cellosolves such as methyl cellosolve, ethyl cellosolve, and phenyl cellosolve; esters such as methyl acetate, ethyl acetate, butyl acetate, and ethyl formate; ketones such as acetone, methyl ethyl ketone, diethyl ketone, methyl isobutyl ketone, methyl isopropyl ketone, and cyclohexanone; aliphatic hydrocarbons (liquid paraffin) such as pentane, hexane, and octane; alicyclic hydrocarbons such as cyclohexane, and methyl cyclohexane; aromatic hydrocarbons such as benzenes having a long-chain alkyl group such as benzene, toluene, xylene, hexyl benzene, heptyl benzene, octyl benzene, nonyl benzene, decyl benzene, undecyl benzene, dodecyl benzene, tridecyl benzene, and tetradecyl benzene; halogen hydrocarbons such as methylene chloride, chloroform, carbon tetrachloride, and 1,2-dichloroethane; aromatic heterocycles such as pyridine, pyrazine, furane, pyrrole, thiophene, and methyl pyrolidone; nitryles such as acetonitrile, propionitrile, and acrylonitrile; amides such as N,N-dimethylformamide, and N,N-dimethylacetamide; carboxylate salt; and other various oils.

Among them, one mainly containing aliphatic hydrocarbons (liquid paraffin) is preferable for the liquid phase dispersion medium 6. The liquid phase dispersion medium 6 mainly containing liquid paraffin is preferable since it has high coagulation inhibitory effect on the electrophoretic particles 5, and low affinity (low solubility) for the constituent material of the capsule body 401. As a result, the display performance of the electrophoretic device 20 can be more reliably prevented or suppressed from being deteriorated in aging. Liquid paraffin is also preferable from the point of view that it has excellent antiweatherability due to having no unsaturated bonds, and high safety.

In addition, branching aliphatic hydrocarbons (isoparaffin) are particularly preferable among aliphatic hydrocarbons (liquid paraffin). Isoparaffin is particularly preferable since it has high coagulation inhibitory effect on the electrophoretic particles 5.

In isoparaffin, the number of carbons is preferably from 5 to 15, and more preferably from 8 to 15. By using isoparaffin having the number of carbons of the above range for the liquid phase dispersion medium 6, an effect can be obtained in which the liquid phase dispersion medium 6 (the electrophoretic dispersion liquid 10) gives sufficiently small sedimentation speed to the electrophoretic particle due to a little specific gravity difference with respect to the electrophoretic particle while the viscosity of the liquid phase dispersion medium 6 is prevented from being unnecessarily increased. As a result, the display performance (particularly, response speed and holding characteristics) of the electrophoretic device 20 can be improved.

Isoparaffin may be used as alone or in combination of two or more.

In addition, if necessary, the following various additives may be added to the liquid phase dispersion medium 6: charge controlling agents formed of particles of such as electrolytes, surfactants (anionic or cationic), metal soaps, resins, rubbers, oils, varnishes, and compounds; dispersive agents such as titanium coupling agents, aluminum coupling agents, and silane coupling agents; lubricating agents; and stabilizing agents.

Examples of surfactants include alkenyl succinic acid ester and alkenyl succinic acid polyimide.

Moreover, if necessary, the following various dyes may be solved in the liquid phase dispersion medium 6: anthraquinone dye, azo dye, indigoid dye, triphenylmethane dye, pyrazolone dye, stilbene dye, diphenylmethane dye, xanthene dye, alizarin dye, acridine dye, quinonimine dye, thiazole dye, methine dye, nitro dye, nitro dye, or the like.

Any particles can be used for the electrophoretic particles 5 as long as they have charges and can be electrophoresed in the liquid phase dispersion medium 6 by an electric field applied. At least one type of pigment particles, resin particles, and compound particles thereof is preferably used.

These particles have advantages in that they are easily manufactured and their charges can be relatively easily controlled.

As pigments included in pigment particles, one or more than one in mixture of the following pigments can be used: first black pigments such as aniline black, carbon black, and titanium black; white pigments such as titanium oxide, antimony oxide, barium sulfate, zinc sulfide, zinc oxide, silicon dioxide, and aluminum oxide; azo pigments such as monoazo, disazo, and polyazo; yellow pigments such as isoindolinone, chrome yellow, yellow iron oxide, cadmium yellow, titanium yellow, and antimony; red pigments such as quinacridone red, and chrome vermilion; blue pigments such as phthalocyanine blue, indanthrene blue, iron blue, ultramarine blue, and cobalt blue; or green pigments such as phthalocyanine green.

As a resin material included in resin particles, one or more than one in mixture of the following exemplary materials can be used: acrylic resin, urethane resin, urea resin, epoxy resin, polystyrene, and polyester.

Examples of composite particle include: pigment particle having the surface coated with a material or another pigment; particle having the surface coated with a pigment; and particle made of a mixture of pigment and resin material with an adequate ratio.

As for the pigment particle having the surface coated with another pigment, titanium oxide particle having the surface coated with silicon dioxide or aluminum oxide is exemplified. These particles are preferably used as the white particle 5*a*.

A carbon black particle or a carbon black particle having the surface coated with a resin material or a pigment is preferably used as the colored particle (black particle) 5*b*.

The shape of the electrophoretic particle 5 is not limited, but a spherical shape is preferable.

The average diameter of the electrophoretic particles 5 is preferably from about 10 nm to about 500 nm, and more preferably from about 20 nm to about 300 nm. By setting the average diameter of the electrophoretic particles 5 in the above range, coagulation between the electrophoretic particles 5 or sedimentation in the liquid phase dispersion medium 6 can be reliably prevented. As a result, display quality of the electrophoretic device 20 can preferably be prevented from being deteriorated.

When two different types of particles are used as in the embodiment, the average diameters of two types of particles are preferably different. Particularly, the average diameter of the white particles 5*a* is preferably larger than that of the colored particles 5*b*. This setting allows the electrophoretic device 20 to further improve the display contrast or holding characteristics.

Specifically, the average diameter of the colored particles 5*b* is preferably from about 20 nm to about 100 nm, while the average diameter of the white particles 5*a* is preferably from about 150 nm to about 300 nm.

In the electrophoretic device 20, when a voltage is applied between the first electrodes 3 and the second electrode 4, the electrophoretic particles 5 (colored particles 5*b* and white particles 5*a*) are electrophoresed toward either the electrodes 3 or electrode 4 while following an electric field generated between the electrodes.

Figure 2A:
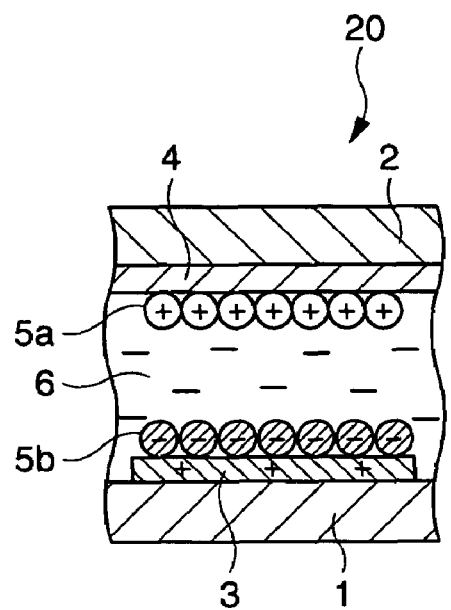
FIGS. 2A and 2B are schematic views illustrating a principle of operation of the electrophoretic device shown in FIG. 1.

When the white particles 5*a* have positive charges, while the colored particles (black particles) 5*b* have negative charges, the white particles 5*a* move toward the second electrode 4 to gather there as shown in FIG. 2A if the first electrodes 3 are set at positive potential. In contrast, the colored particles 5*b* move toward the first electrodes 3 to gather there. As a result, the color of the electrophoretic particles 5*a*, i.e. white can be seen from above the electrophoretic device 20 (from the side of the display face).

Figure 2B:
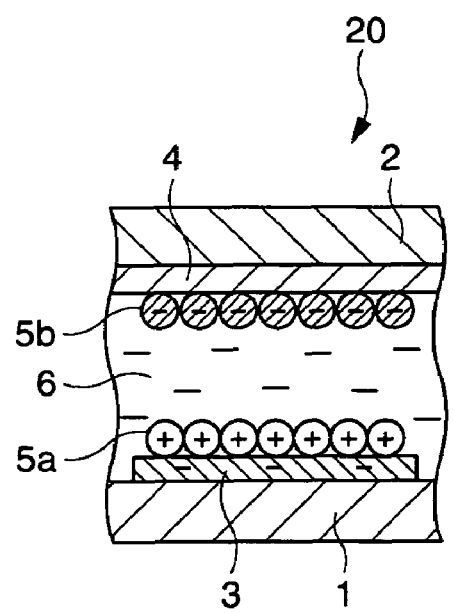

Conversely, the white particles 5*a* move toward the first electrodes 3 to gather there as shown in FIG. 2B if the first electrodes 3 are set at negative potential. In contrast, the colored particles 5*b* move toward the second electrodes 4 to gather there. As a result, the color of the colored particles 5*b*, i.e. black can be seen from above the electrophoretic device 20 (from the side of the display face).

In the structure, desired information (image) are displayed on the side of the display surface of the electrophoretic device 20 according to the color combination of the white particles 5*a* and the colored particles 5*b*, or the number of particles gathered at the electrodes 3 and 4 by adequately setting charged amount of the electrophoretic particles 5 (the white particles 5*a* and the colored particles 5*b*), the polarities of the electrodes 3 and 4, and a potential difference between the electrodes 3 and 4.

In addition, the specific gravity of the electrophoretic particles 5 is preferably set so as to be approximately the same as the specific gravity of the liquid phase dispersion medium 6. Accordingly, the electrophoretic particles 5 can stay at a fixed position in the liquid phase dispersion medium 6 for a long period even after a voltage applied between the electrodes 3 and the electrode 4 is stopped. In other words, information displayed on the electrophoretic device 20 is kept for a long time.

The binder 41 functions to fix the microcapsules 40 (to hold the positional relationship of the microcapsules 40). In the invention, the binder 41 has viscid property at normal temperature. Here, the term "viscid property" means a property that shows relatively high viscous behavior while maintaining its fluidity.

Since the binder 41 is not solidified or hardened at normal temperature while maintaining its fluidity, the binder 41 allows the microcapsules 40 to move (to be re-arranged) in the microcapsule contained layer 400.

Accordingly, the arranging density of the microcapsules 40 in the microcapsule contained layer 400 can be uniformed by moving the microcapsules 40 even though an area in which the microcapsules 40 are overlapped and an area including no microcapsules 40 exist in the microcapsule contained layer 400. In addition, the microcapsules 40 can reliably contact each other since the arranging density of the microcapsules 40 in the microcapsule contained layer 400 can be uniformed. As a result, the stonewall structure described above can be further reliably formed.

Using the binder 41 also has an advantage in that the microcapsules 40 can simply be re-arranged in bonding the electrophoretic sheet 21 and the circuit substrate 22, which will be described later.

Selection of the binder 41 having higher viscosity also can give a function to the binder 41 to fix (bond) the electrophoretic sheet 21 and the circuit substrate 22.

Further, no dispersion medium is needed for preparing a microcapsule dispersion liquid to form the microcapsule contained layer 400 since the binder 41 maintains fluidity at normal temperature. As a result, disadvantages such as a breeding out of a liquid phase dispersion medium, and a lowering of contrast can be prevented, which disadvantages caused by a dispersion medium that remains in the microcapsule contained layer 400.

Conventionally, it is widely carried out that an emulsion adhesive is used for a binder, and water is used as a dispersion medium in preparing a microcapsule dispersion liquid. The use of water as a dispersion medium arises a problem such as a capsule body is altered or deteriorated by moisture absorption, and an organic semiconductor layer is altered or deteriorated by moisture absorption when an organic semiconductor TFT is used as a switching element in the circuit substrate 22. As a result, display performance of electrophoretic devices is lowered.

In contrast, the electrophoretic device 20 does not arise the problem since no water is needed in the invention for preparing a microcapsule dispersion liquid.

The melting point of the binder 41 is preferably 25 degrees centigrade or less, more preferably 20 degrees centigrade or less. The binder 41 described above shows sufficient fluidity at normal temperature, whereby the binder 41 (microcapsule dispersion liquid) is easily handled at normal temperature.

The 180-degree peeling adhesive strength, which is defined in JIS K 6854, is preferably from about 5N/25 mm to about 150N/25 mm, more preferably from about 25N/25 mm to about 125N/25 mm. The binder 41 having the 180-degree peeling adhesive strength of the above range demonstrates appropriate viscosity at normal temperature. As a result, the electrophoretic sheet 21 and the circuit substrate 22 can be reliably bonded (fixed) by using the binder 41.

Examples of the binder 41 include: (metha)acrylic acid ester, laurate ester, and stearic acid ester. One or more than one in mixture of them can be used.

Examples of (metha)acrylic acid ester include: (metha) acrylic acid ester having linear alkyl group; (metha)acrylic acid ester having branching alkyl group; (metha)acrylic acid ester having unsaturated alkyl group; multifunctional (metha)acrylic acid ester having a functional group such as glycidyl group different from (metha)acrylic group; and multifunctional (metha)acrylic acid ester having a plurality of (metha) acrylic groups.

Among them, one mainly containing (metha)acrylic acid ester is preferable for the binder 41. The binder 41 mainly containing (metha) acrylic acid ester is preferable since it is easily available and has appropriate viscid property at normal temperature.

The number of carbons in (metha)acrylic acid ester is preferably from 5 to 20, more preferably from 8 to 16. It is yet more preferably that (metha)acrylic acid ester mainly contains at least one of dodecyl(metha)acrylate and 2-ethylhexyl(metha)acrylate. The binder 41 mainly containing (metha)acrylic acid ester described above is preferable since it has more appropriate viscid property at normal temperature.

The dielectric constant of the binder 41 is preferably set so as to be approximately the same as that of the liquid phase dispersion medium 6. In this case, a dielectric regulator such as alcohols such as 1,2-butanediol, and 1,4-butanediol; ketones; and carboxylates may be added into the binder 41.

In the embodiment, the electrophoretic sheet 21 and the circuit substrate 22 are bonded with the adhesive layer 8 interposed therebetween. The adhesive layer 8 can more reliably fix the electrophoretic sheet 21 and the circuit substrate 22 compared to a case having no adhesive layer 8.

The adhesive layer 8 preferably has the following four functions other than the function to bond (fix) the electrophoretic sheet 21 and the circuit substrate 22. A first function to have insulation property, a second function to prevent an ion from diffusing to the circuit substrate 22 from the electrophoretic sheet 21, a third function to absorb and hold moisture penetrating into the electrophoretic device 20, and a fourth function to reduce a stress in bonding the electrophoretic sheet 21 and the circuit substrate 22.

The first function can reliably prevent the first electrodes 3 and the second electrode 4 from being shorted, whereby an electric field can reliably act on the electrophoretic particles 5. The second function can prevent or suppress the characteristics of a circuit (particularly, switching elements) provided in the circuit substrate 22 from being lowered. The third function can prevent or suppress the microcapsules 40 and a circuit provided in the circuit substrate 22 from moisture diffusion even though moisture penetrates into the electrophoretic device 20, thereby enabling the microcapsules 40 and the circuit to be prevented from being deteriorated. The fourth function can prevent the microcapsules 40, switching elements and the like provided in the circuit substrate 22 from being broken in manufacturing (making) the electrophoretic device 20.

The adhesive layer 8 preferably has at least one of the first to the fourth functions, more preferably any two or more of the functions, and yet more preferably all functions. Accordingly, durability and reliability of the electrophoretic device 20 can be further improved.

The adhesive layer 8 preferably mainly contains polyurethane. Polyurethane is preferable since it can reliably give the above functions to the adhesive layer 8.

Polyurethane includes an isocyanate component and a polyol component. The isocyanate component is at least one of tetramethylxylenediisocyanate (TMXDI), hexamethylenediisocyanate (HMDI), hydrogenated diphenylmethanediisocyanate ($^{12}$H-MDI), and derivatives thereof, while the polyol component is at least one of polypropyleneglycol (PPG), polytetramethyleneglycol (PTMG), 1,6-hexanediol (HD), bis (hydroxymethyl) propionic acid (BHMPCA), and derivatives thereof.

The polyurethane may contain, for example, ethoxylated dicyclopentenyl (metha)acrylate as another component. Containing such other components allows the adhesive layer 8 to adhere more tenaciously to the microcapsule contained layer 400, i.e. (metha)acrylic acid ester, which is preferably used in the binder 41 as aforementioned.

As the binder 8, instead of polyurethane, one or more than one in mixture of the following exemplary resin materials can be used: thermoplastic resins such as polyethylene, chlorinated polyethylene, ethylene-vinyl acetate copolymer, ethylene-ethyl acrylate copolymer, polypropylene, AS resin, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, and cellulose-based resin; polymers such as polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, and polyether imide; fluororesins such as polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, and fluororubber; silicone resins such as silicone resins, and silicone rubber; methacrylic acid-styrene copolymer; polybutylene; and methyl methacrylate-butadiene-styrene copolymer.

The average thickness A (μm) of the adhesive layer 8 and the average thickness B (μm) of the microcapsule contained layer 400 preferably satisfies the relation of A/B from 0.1 to 3, more preferably from 0.5 to 2. This relation particularly can improve the first to fourth functions. The practical average diameter of the microcapsules 8 is preferably about 1 μm to about 30 μm, and more preferably about 5 μm to about 20 μm.

The sealing part 7 is provided between the bases 1 and 2 and along the peripheries thereof. The sealing part 7 airtightly seals the electrodes 3 and 4, microcapsule contained layer 400 and the adhesive layer 8, enabling the electrophoretic device 20 to be prevented from moisture penetration. As a result, display performance of the electrophoretic device 20 can be prevented from being deteriorated.

As the sealing part 7, one or more than one in mixture of the following exemplary materials can be used: thermoplastic resins such as acrylic resins, urethane resins, and olefinic resins; and thermoset resins such as epoxy resins, melamine resins, and phenol resins.

The sealing part 7 may be provided if needed or may not be provided.

The electrophoretic device 20 can be manufactured as described below.

A method for manufacturing the electrophoretic device 20 will be described as another embodiment of the invention.

FIGS. 3A through 3D and 4E through 4G are schematic views illustrating a method for manufacturing the electrophoretic device shown in FIG. 1. In the following description, the top side in FIGS. 3A through 3D and FIGS. 4E through 4G is described as "up", while the bottom side is described as "down".

1. Process for Manufacturing the Microcapsules 40

First, the microcapsules 40 encapsulating the electrophoretic dispersion liquid 10 are manufactured.

As the method for manufacturing the microcapsule 40 (a method for encapsulating the electrophoretic dispersion liquid 10 into the capsule body 401), though it is not limited, the following exemplary microcapsulating methods can be used: an interfacial polymerization method, an in-situ polymerization method, a phase separation method (or a coacervation method), an interfacial sedimentation method, and a spray dry method. An appropriate microcapsulating method may be selected from the above methods depending on constituent materials and the like of the microcapsule 40.

The microcapsules 40 having an uniformed size can be provided by a sieve separating method, a filtration method, and a specific gravity difference classification method, for example.

The average diameter of the microcapsules 40 is preferably from about 5 μm to about 50 μm, and more preferably from about 10 μm to about 30 μm. By setting the average diameter of the microcapsules 40 as the above range, the electrophoretic particles 5 can be controlled so as to reliably electrophorese in the electrophoretic device 20 manufactured.

2. Preparation Process of a Microcapsule Dispersion Liquid

Next, a microcapsule dispersion liquid is prepared by mixing the microcapsules 40 manufactured as described above and the binder 41 having viscid property at normal temperature.

A contained amount of the microcapsules 40 in the microcapsule dispersion liquid is preferably from about 10 wt % to about 80 wt %, more preferably from about 30 wt % to about 60 wt %.

Setting the contained amount of the microcapsules 40 as the above range is very favorable in moving and providing (re-arranging) the microcapsules 40 so as not to overlap each other in the thickness direction (so as to be single layer) in the microcapsule contained layer 400.

3. Forming Process of a Microcapsule Contained Layer

Figure 3A:
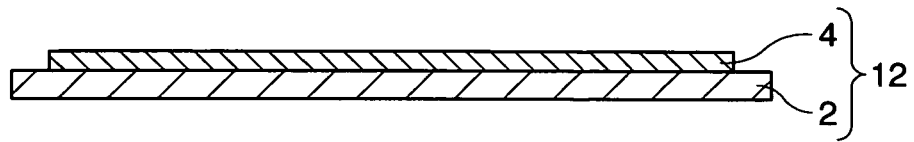
FIGS. 3A through 3D are schematic views illustrating a method for manufacturing the electrophoretic device shown in FIG. 1.
Figure 3B:
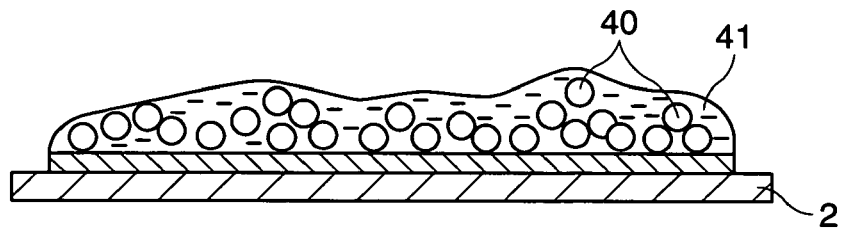

Then, the microcapsule dispersion liquid is supplied on the substrate 12 as shown in FIG. 3B.

As a method for providing the microcapsule dispersion liquid, the following exemplary coating methods can be used: a spin coat method, a dip coat method, and a spray coat method.

Next, the microcapsules 40 are evened out so that the thickness (amount) of the microcapsule dispersion liquid is uniformed at every part of the substrate 12, preferably, the microcapsules 40 are arranged piece by piece (so as to be single layer) so as not to overlap each other in the thickness direction.

Figure 3C:
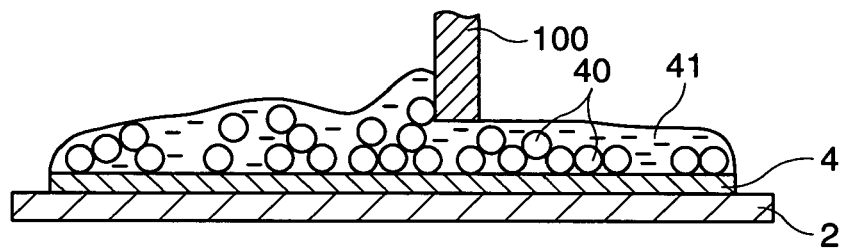
Figure 3D:
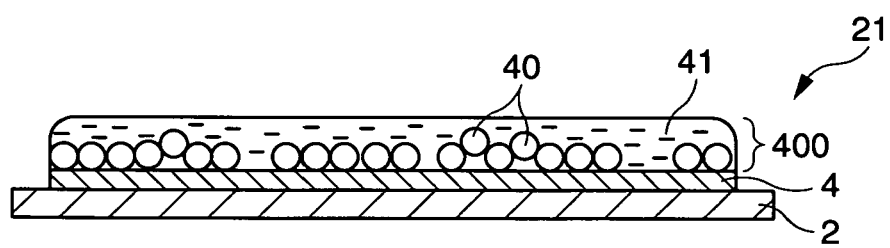

This leveling can be done, for example as shown in FIG. 3C, by moving the microcapsules 40 with a squeegee (a tabular jig) 100 through over the substrate 12 to sweep the microcapsules 40, whereby, the microcapsule contained layer 400 is formed. As a result, the electrophoretic sheet 21 as shown in FIG. 3D is achieved (a first step).

4. Bonding Process of the Circuit Substrate 22 (a Second Step)

Figure 4E:
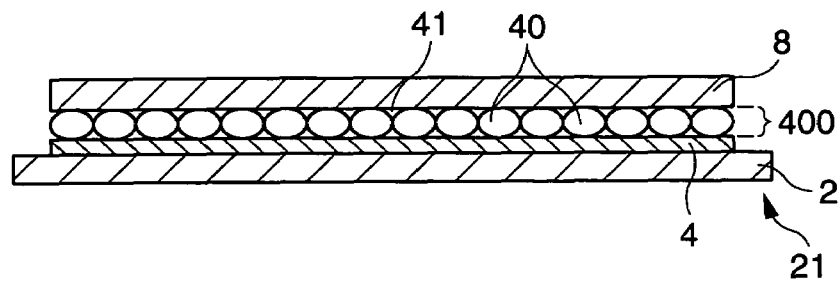
FIGS. 4E through 4G are schematic views illustrating a method for manufacturing the electrophoretic device shown in FIG. 1.

Then, as shown in FIG. 4E, the adhesive layer 8 is formed on the microcapsule contained layer 400.

The adhesive layer 8 can be formed, for example, by disposing the adhesive layer having a sheet shape on the microcapsule contained layer 400 by using a transfer method or the like.

Figure 4F:
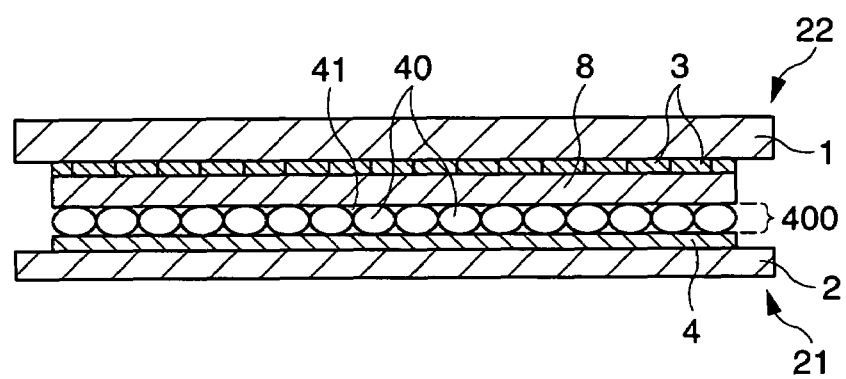

Next, as shown in FIG. 4F, the circuit substrate 22, which is prepared separately, is overlapped on the adhesive layer 8 so that the first electrodes 3 contacts to the adhesive layer 8.

As a result, the electrophoretic sheet 21 and the circuit substrate 22 are bonded with the adhesive layer 8 interposed therebetween.

In the embodiment, the binder 41 maintains fluidity since the binder 41 has viscid property (fluidity and viscosity) at normal temperature and the bonding process is done at normal temperature. Accordingly, even though an area in which the microcapsules 40 overlap each other or an area including no microcapsules 40 exists in the microcapsule contained layer 400, upon disposing the adhesive layer 8 on the microcapsule contained layer 8, the microcapsules 40 protruded upward from the adhesive layer 8 are pressed downward to move and push the microcapsules 40 surrounded thereof As a result, the microcapsules 40 are arranged so as to uniform the arranging density of the microcapsules 40 in the microcapsule contained layer 400.

In this regard, the microcapsules 40 can be deformed (refer to FIG. 4E) by own weight of the adhesive layer 8 and the circuit substrate 22, or by a force applied so that the circuit substrate 22 and the electrophoretic sheet 21 approach (so as to reduce the thickness of the microcapsule contained layer 400) if needed.

As a result, the arranging density of the microcapsules 40 can be uniformed at every part of the microcapsule contained layer 400, and the stonewall structure (flattened shape) can be reliably formed. As a result, the electrophoretic display device 20 having superior display performance such as a contrast and response speed is provided.

In the embodiment, electrophoretic dispersion liquid can be prevented from bleeding out of microcapsules, and influences due to an applied pressure can be prevented since no applied force is needed in bonding the electrophoretic sheet 21 and the circuit substrate 22.

In addition, the circuit substrate 22 and the electrophoretic sheet 21 may be bonded with the adhesive layer 8 provided to the circuit substrate 22, while the circuit substrate 22 and the electrophoretic sheet 21 also may be bonded with the adhesive layer 8 provided to both the circuit substrate 22 and the electrophoretic sheet 21.

The adhesive layer 8 having a sheet shape is preferably disposed on the microcapsule contained layer 400 by the following exemplary manner: one end of the adhesive layer 8 touches the microcapsule contained layer 400 while being bent, and then continues touching it up to the other end. This procedure can prevent bubbles from being produced between the microcapsule contained layer 400 and the adhesive layer 8, and reliably rearrange the microcapsules 40.

5. Sealing Process

Figure 4G:
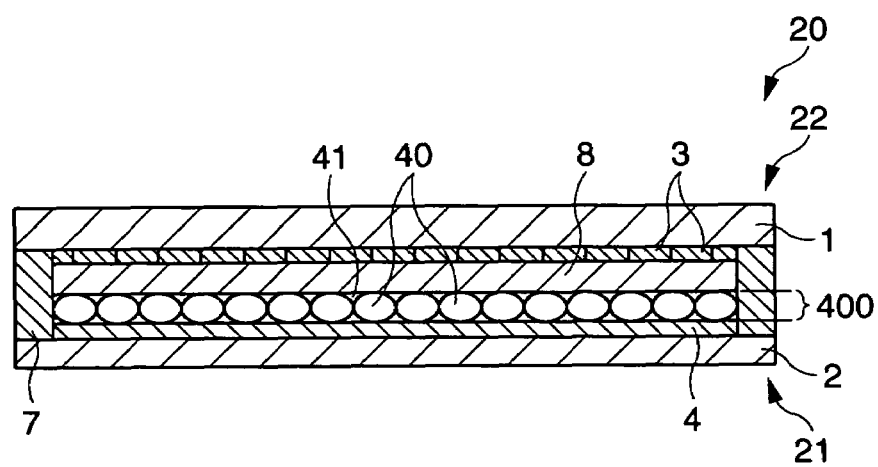

Next, as shown in FIG. 4G, sealing part 7 is formed along the peripheries of the electrophoretic sheet 21 and the circuit substrate 22.

The sealing part 7, which is disposed between the electrophoretic sheet 21 (base 2) and the circuit substrate 22 (base 1), can be formed by applying a material for forming the sealing part 7 along the peripheries thereof with a dispenser, for example, and then solidifying or hardening the material.

Through the above-described processes, the electrophoretic device 20 is achieved.

Electronic Apparatus

The electrophoretic device 20 described above can be built in various electronic apparatuses. Electronic apparatuses, which are provided with the electrophoretic device 20, according to another embodiment of the invention will be described below.

Electronic Paper

First, a modification will be described in which the electronic apparatus of the embodiment is applied to an electronic paper.

Figure 5:
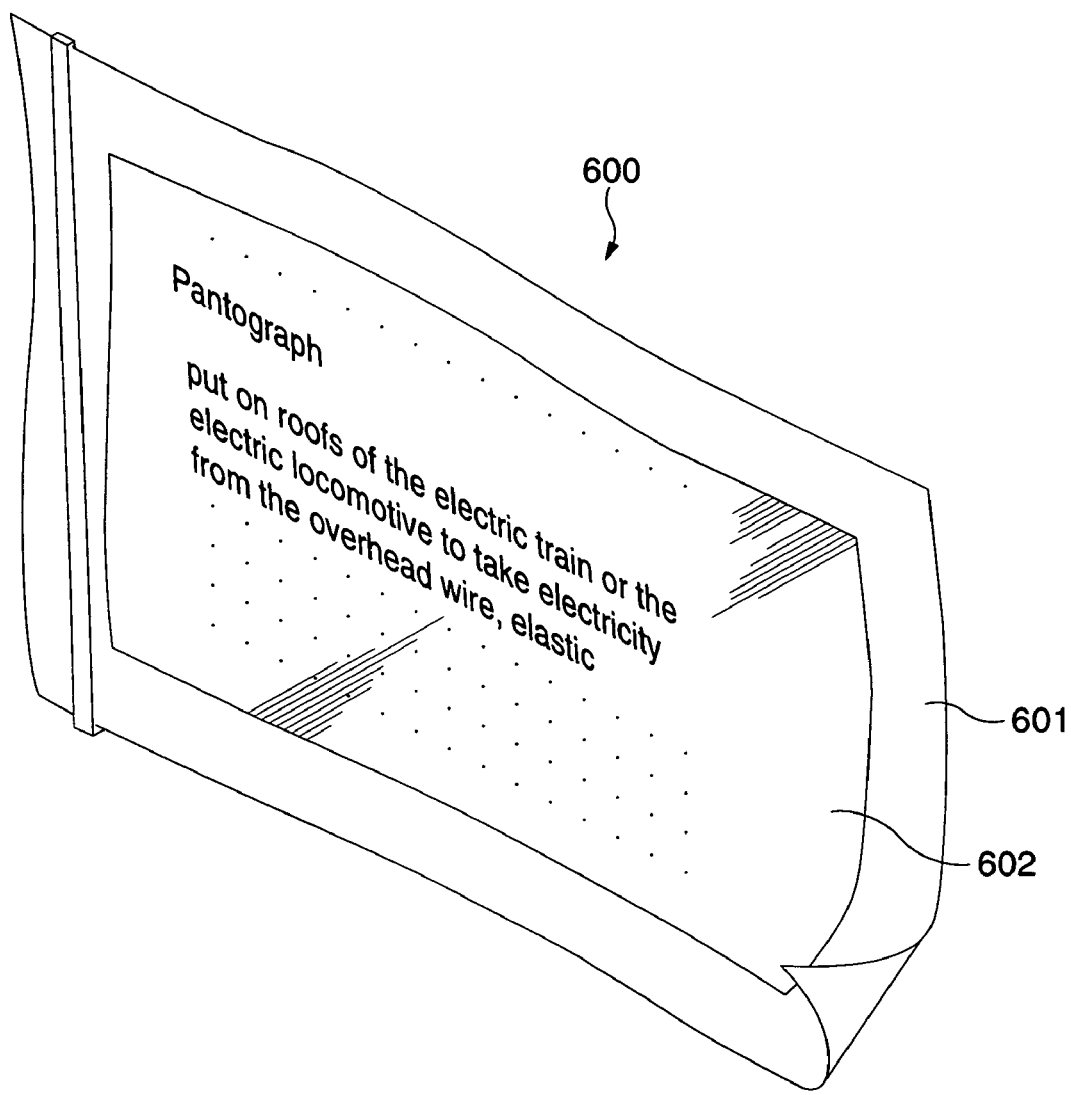
FIG. 5 is a perspective view illustrating a modification in which an electronic apparatus according to another embodiment of the invention is applied to an electronic paper.

FIG. 5 is a perspective view illustrating the modification in which the electronic apparatus of the embodiment is applied to an electronic paper.

An electronic paper 600 shown in FIG. 5 includes a main body 601 that is composed of a rewritable sheet having the same texture and flexibility as those of papers, and a display unit 602.

In the electronic paper 600, the display unit 602 is provided with the electrophoretic device 20 described above.

Display

Next, another modification will be described in which the electronic apparatus of the embodiment is applied to a display.

Figure 6A:
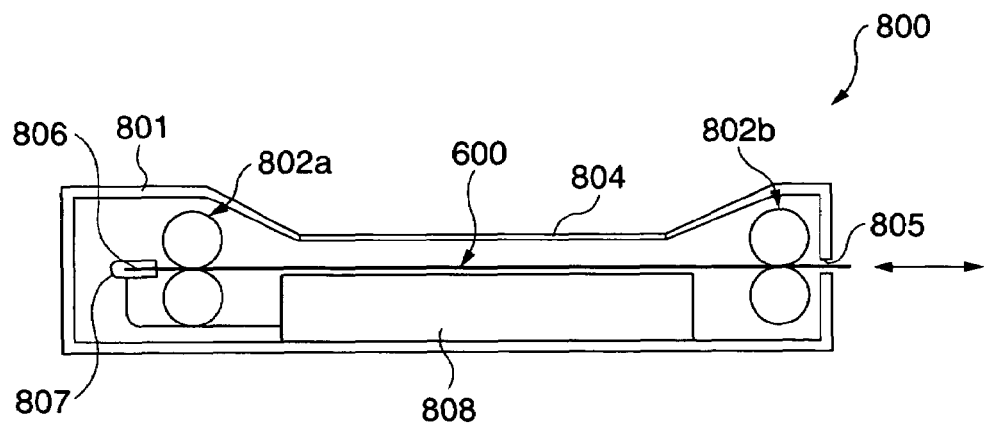
FIGS. 6A and 6B are diagrams illustrating another modification in which the electronic apparatus according to the embodiment is applied to a display.
Figure 6B:
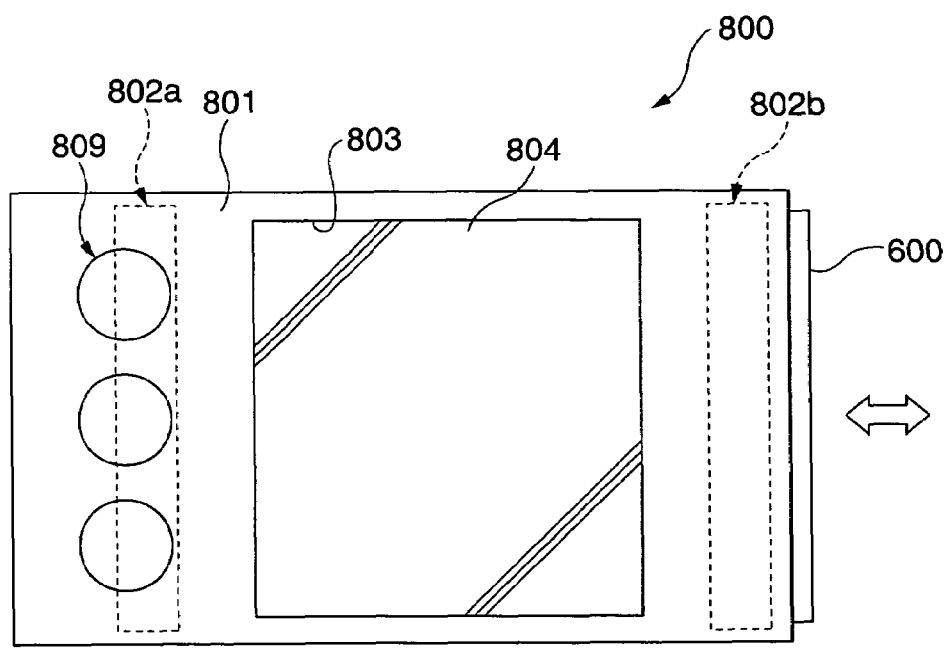

FIGS. 6A and 6B are diagrams illustrating the modification in which the electronic apparatus of the embodiment is applied to a display. FIG. 6A is a sectional view, and FIG. 6B is a plan view.

A display (a display device) 800 shown in FIGS. 6A and 6B includes a main body 801, and the electronic paper 600 that is removably provided to the main body 801. The electronic paper 600 has the structure as described above, i.e., the same structure as that shown in FIG. 5.

The main body 801 has an insertion slot 805, into which the electronic paper 600 can be inserted, on its side (the right side in FIG. 6A). The body 801 also has two pairs of feed rollers 802a and 802b inside. When the electronic paper 600 is inserted through the insertion slot 805 into the main body 801, the electronic paper 600 is fed into the body 801, while being sandwiched by the two pairs of feed rollers 802a and 802b.

A rectangular opening 803 is formed on the side of the display surface (in front of FIG. 6B) of the main body 801, and a transparent glass plate 804 is embedded in the opening 803. Accordingly, the electronic paper 600 disposed into the main body 801 is visible from the outside of the main body 801. In other words, the electronic paper 600 disposed into the main body 801 is visible through the transparent glass plate 804 in the display 800.

Also, a terminal 806 is provided at the leading end of the electronic paper 600 (the left side in FIG. 6A) in the inserting direction. Inside the main body 801, a socket 807 is provided. The socket 807 is coupled to the terminal 806 when the electronic paper 600 is fed into the main body 801. The socket 807 is electrically coupled to a controller 808 and an operation unit 809.

In the display 800, the electronic paper 600 is removably provided to the main body 801, and thus can be detached from the main body 801 for portable use.

In the display 800, the electronic paper 600 is provided with the electrophoretic device 20.

Examples of the electronic apparatus of the embodiment, which are not limited to the described above, include TVs, video tape recorders of viewfinder types or monitor viewing types, car navigation systems, pagers, electronic notebooks, calculators, electronic newspapers, word processors, personal computers, workstations, videophones, point-of-sale terminals, and apparatuses provided with a touch panel. The electrophoretic device 20 of the embodiment can be applied to the display of the electronic apparatuses.

The electrophoretic sheet, the electrophoretic device, the method for manufacturing an electrophoretic device and the electronic apparatus of the invention have been described based on the embodiments illustrated in the drawings. However, the invention is not limited to them. The structure of each part can be replaced with any other structures having similar functions. In addition, other any structures can be added to the invention.

In the embodiments described above, the structure in which a pair of electrodes is provided to face each other is described, but it is not limited to this. For example, a structure in which a pair of electrodes is provided on the same substrate is also applicable.

Further, in the embodiments, a structure in which a pair of substrates is provided to face each other is described, but it is not limited to this. For example, a structure having a single substrate is also applicable.

In the embodiments, microcapsules are located to straddle two adjacent pixel electrodes (electrodes), but it is not limited to this. For example, the microcapsules may be located to straddle three or more of adjacent pixel electrodes or located without straddling adjacent pixel electrodes. In addition, these arrangements may be mixed.

The method for manufacturing an electrophoretic device of the embodiment may further include one or more than one process for any purpose.

EXAMPLE

A specific example according to the invention will now be described.

1. Manufacturing an Electrophoretic Device

EXAMPLE

First, white particles having a spherical shape with an average diameter of 200 nm, and black particles having a spherical shape with an average diameter of 60 nm were prepared.

A mixture of titanium oxide particles covered with silicon oxide and titanium oxide particles covered with aluminum oxide was used as the white particle, while carbon black particles were used as the black particle.

Then, an electrophoretic dispersion medium was prepared by dispersing the white particles and the black particles into a liquid phase dispersion medium so as to be a weight ratio of white particles:black particles=50:50.

Isopar M (available from Exxon Mobil Chemical) was used as the liquid phase dispersion medium.

Next, the electrophoretic dispersion medium was dribbled into a solution in which gelatin had been dissolved, and then the solution was agitated. The agitation speed was 1300 rpm.

Next, the solution was adjusted to pH=3.7 using acetic acid, and then the solution was cooled with ices to form capsules. Cross-linked structures were formed in the capsules by adding formaldehyde.

Next, the solution was agitated for 24 hours, and then was classified to obtain microcapsules having an average diameter of 20 μm.

Next, a microcapsule dispersion liquid was prepared by mixing the obtained microcapsules and a binder so as to be a weight ratio of 3:2.

The binder was liquid at 25 degrees centigrade, and had viscid property. The binder also had a 180-degree peeling adhesive strength, which is defined in JIS K 6854, of 50 N/25 mm.

As the binder, a mixture was used in which dodecylmethacrylate (melting point: 25 degrees or less) and 2-ethylhexylacrylate (melting point: 25 degrees or less) were mixed so as to be a weight ratio of 90:10.

Next, a substrate, on which the second electrode made of ITO had been formed, was prepared.

Next, the microcapsule dispersion liquid was coated on the substrate by a doctor blade method to form a microcapsule contained layer having an average thickness of 30 μm.

Next, an adhesive layer having an average thickness of 15 μm was prepared, and then disposed on the microcapsule contained layer at normal temperature (25 degrees centigrade). As a result, the average thickness of the microcapsule contained layer became about 15 μm, and the microcapsules were deformed to be a flattened shape. That is, the formation of a stonewall structure was confirmed.

As the adhesive layer, a mixture was used in which polyurethane and ethoxylated dicyclopentenyl methacrylate were mixed so as to be a weight ratio of 95:5.

Next, a circuit substrate, on which the first electrode made of ITO had been formed, was disposed on the adhesive layer at normal temperature (25 degrees centigrade), and then the edge parts (peripheral parts) of the substrate and the circuit substrate were sealed with an epoxy adhesive. As a result, the electrophoretic device shown in FIG. 1 was achieved.

COMPARATIVE EXAMPLE

An electrophoretic device was manufactured in the same manner as in the example, except that the microcapsule contained layer was formed as follows.

A microcapsule dispersion liquid was prepared by using a silicone adhesive (an emulsion adhesive) as a binder, and water as a dispersion liquid.

The mixing ratio of microcapsules, the binder, and water was a weight ratio of 56:4:40.

2. Evaluation

The condition of the microcapsules was checked in each electrophoretic device obtained in the example and comparative example. As a result, in the example, the microcapsules existed approximately uniformly at every part of the electrophoretic device, and were a flattened shape. In contrast, in the comparative example, an area in which the microcapsules overlapped each other and another area including no microcapsules existed while the microcapsules were a flattened shape.

Images were displayed each electrophoretic device obtained in the example and the comparative example. As a comparison result, a little display unevenness was found in the electrophoretic device of the example, while display unevennesses ware obviously found in the electrophoretic device of the comparative example.

An electrophoretic device was manufactured in the same manner as in the example using one or more than one in mixture of lauryl acrylate, cyclohexyl acrylate, cetyl acrylate, isobutyl methacrylate, lauryl methacrylate, and cyclohexyl methacrylate, all of which have viscid property at normal temperature. As a result, the electrophoretic device having favorable display performance was obtained.

What is claimed is:

1. An electrophoretic sheet, comprising:
   a substrate having a first side;
   a microcapsule contained layer having a second side and a third side facing the second side, the second side being disposed on the first side of the substrate, the layer including:
      a microcapsule; and
      a binder having viscid property at normal temperature and holding the microcapsule, the microcapsule including:
         a shell;
         an electrophoretic dispersion liquid included in the shell; and
         at least one electrophoretic particle included in the electrophoretic dispersion liquid.

2. The electrophoretic sheet according to claim 1, wherein a melting point of the binder is 25 degrees centigrade or less.

3. The electrophoretic sheet according to claim 1, wherein the binder contains at least one of methacrylic ester and acrylic ester.

4. The electrophoretic sheet according to claim 3, wherein the number of carbons of the at least one of methacrylic ester and acrylic ester is from 5 to 20.

5. The electrophoretic sheet according to claim 1, wherein the shell contains a material including gelatin.

6. The electrophoretic sheet according to claim 1, wherein the electrophoretic dispersion liquid includes a dispersion medium containing liquid paraffin.

7. The electrophoretic sheet according to claim 6, wherein the liquid paraffin is isoparaffin.

8. The electrophoretic sheet according to claim 7, wherein the number of carbons of the isoparaffin is from 5 to 15.

9. An electrophoretic device, comprising:
   the electrophoretic sheet according to claim 1; and
   a counter substrate disposed adjacent to the third side of the microcapsule contained layer.

10. The electrophoretic device according to claim 9 further comprising an adhesive layer bonding the electrophoretic sheet and the counter substrate.

11. The electrophoretic device according to claim 10, wherein the adhesive layer has insulation property.

12. The electrophoretic device according to claim 10, wherein the adhesive layer prevents an ion from diffusing to the counter substrate from the electrophoretic sheet.

13. The electrophoretic device according to claim 10, wherein the adhesive layer absorbs and holds moisture that penetrates into the electrophoretic device.

14. The electrophoretic device according to claim 10, wherein the adhesive layer reduces a stress produced in bonding the electrophoretic sheet and the counter substrate.

15. The electrophoretic device according to claim 10, wherein the adhesive layer mainly contains polyurethane.

16. The electrophoretic device according to claim 10, wherein a ratio of an average thickness of the adhesive layer to an average thickness of the microcapsule contained layer is from 0.1 to 3.

17. An electronic apparatus, comprising the electrophoretic device according to claim 9.

18. An electrophoretic sheet, comprising:
a substrate having a first side;
a microcapsule contained layer having a second side and a third side facing the second side, the second side being disposed on the first side of the substrate, the layer including:
a microcapsule; and
a binder having viscid property at normal temperature, and holding the microcapsule, the microcapsule including:
a shell;
an electrophoretic dispersion liquid included in the shell; and
at least one electrophoretic particle included in the electrophoretic dispersion liquid,
wherein the binder has a 180-degree peeling adhesive strength of from 5N/25 mm to 150N/25 mm as measured in accordance with JIS K 6854.

* * * * *